(12) United States Patent
Woodward

(10) Patent No.: US 6,607,312 B1
(45) Date of Patent: Aug. 19, 2003

(54) METHOD AND DEVICE FOR BROADCASTING SIGNALS OVER A WAVELENGTH-DIVISION MULTIPLEXED NETWORK

(75) Inventor: Sheryl Leigh Woodward, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/469,486

(22) Filed: Dec. 22, 1999

(51) Int. Cl.⁷ ................................................ H04J 14/02
(52) U.S. Cl. ...................... 398/82; 398/79; 398/83; 398/87; 398/139; 385/24; 385/37; 385/16; 385/17
(58) Field of Search .............................. 398/79, 82, 83, 398/87, 139; 385/24, 37, 16, 17

(56) References Cited

U.S. PATENT DOCUMENTS 5,903,371 A * 5/1999 Arecco et al. ............. 359/119
5,982,518 A * 11/1999 Mizrahi ..................... 359/130
6,002,503 A * 12/1999 Mizrahi ..................... 359/124
6,038,046 A * 3/2000 Kaneko et al. ............. 359/130
6,219,474 B1 * 4/2001 Cai et al. ..................... 385/24
6,240,109 B1 * 5/2001 Shieh .......................... 372/18
6,281,977 B1 * 8/2001 Paiam et al. ................ 356/480
6,351,323 B1 * 2/2002 Onaka et al. ............... 359/187

* cited by examiner

Primary Examiner—Jason Chan
Assistant Examiner—Hanh Phan

(57) ABSTRACT

The optical device is located at a node connected of an optical network. The optical device receives optical signals, each received signal having a different wavelength. The optical device comprises a wavelength-selective optical tap that selectively drops a first portion of the optical power of a received optical signal having a specific wavelength. The optical device also optically conveys the optical signal having the specific wavelength to a next node, the conveyed optical signal having a second portion of the optical power of the received optical signal having the specific wavelength.

1 Claim, 3 Drawing Sheets

METHOD AND DEVICE FOR BROADCASTING SIGNALS OVER A WAVELENGTH-DIVISION MULTIPLEXED NETWORK

BACKGROUND OF THE INVENTION

1. Field of Invention

This invention relates generally to communication systems and methods. More particularly, this invention relates to communication systems and methods for broadcasting signals over an optical network.

2. Description of Related Art

A Wavelength-Division Multiplexed (WDM) network is an optical network on which information is transmitted using a plurality of optical signals having different wavelengths. For example, the network comprises optical fibers carrying optical signals generated by a plurality of laser sources modulated by digital or analog signals. The modulation incorporates the information to be transmitted into the optical signals.

Employing WDM networks to improve both the capacity and flexibility of optical networks is an area of active research. Current WDM networks support point-to-point wavelength connections in which a network is comprised of an origination node and any number of potential destination nodes located throughout the network. Wavelengths can be added or dropped at each potential destination node or can bypass each node.

Current research on WDM networks has focused on carrying switched services. Therefore, optical signals are either dropped entirely at a potential destination node or wholly transported through the potential destination node to move throughout the network. To receive a broadcast optical signal having a specific wavelength, a potential destination node drops the entire optical power relating to this specific wavelength, and converts the optical signal to an electronic signal. Electronic equipment at the node (such as an internet-protocol router) then uses this electronic signal to convey the transmitted information to a device at the destination node for use at the destination mode. Additionally, the electronic equipment at the node uses the electronic signal to modulate an optical source to generate another optical signal having the specific wavelength and then forwards the new optical signal to other node(s) on the optical network.

Such a node is complex and expensive. Moreover, the transmission time of the broadcast optical signal through a node is longer than the transmission time of the other optical signals through the node. This additional delay will degrade the performance of some services. Because some network management functions, such as restoration, are time sensitive, this delay may prevent the broadcast optical signal from being used for network management.

SUMMARY OF THE INVENTION

Therefore, there is a need for a low-cost, fast optical device that can be located at potential destination nodes and used to relay broadcast optical signals on a WDM network.

Accordingly, the exemplary embodiments of the invention provide an optical device for a node connected to an optical channel within an optical network. The node receives optical signals, each received signal having a different wavelength on the optical channel. The optical device includes a wavelength-selective optical tap that selectively drops a first portion of the optical power of a received optical signal having a specific wavelength. The device also transmits the optical signal having the specific wavelength to a next node. The transmitted optical signal has a second portion of the originally received optical power at the specified wavelength. The optical device may be referred to as a wavelength-selective optical tap.

This and other features and advantages of the invention are described in or are apparent from the following detailed description of the exemplary embodiments.

BRIEF DESCRIPTION OF THE DRAWINGS

The benefits of the present invention will be readily appreciated and understood from consideration of the following detailed description of the exemplary embodiments of this invention when taken with the accompanying drawings, in which.

DETAILED DESCRIPTION OF PREFERRED EMBODIMENTS

Figure 1:
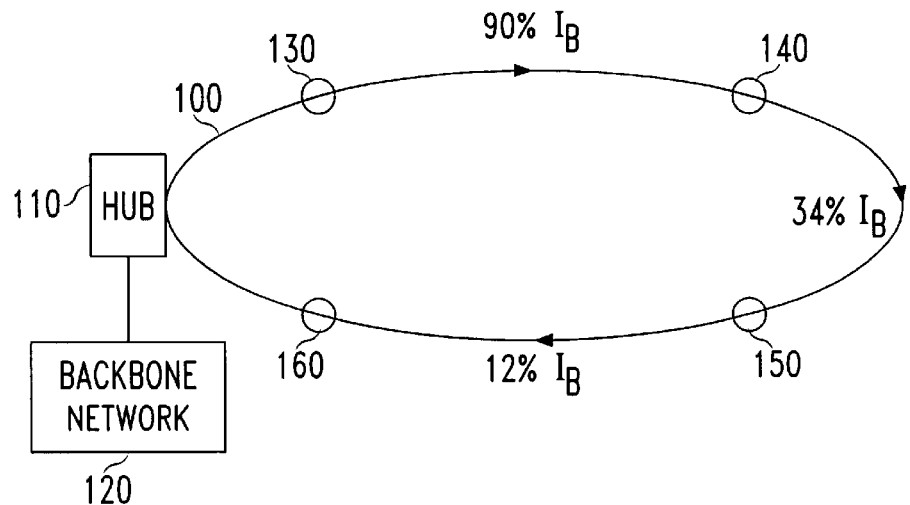
FIG. 1 is a schematic diagram showing an optical network carrying broadcast traffic.

FIG. 1 is a schematic diagram showing a unidirectional ring network 100 carrying broadcast traffic. As shown in FIG. 1, the ring network 100 is connected through a hub 110 to a backbone network 120. Within the ring network 100 are positioned four wavelength-selective optical taps 130, 140, 150 and 160, each located within an access node. Access nodes, represented by circles, receive a dedicated wavelength and a broadcast wavelength $\lambda_B$.

The ring 100 includes an optical line that carries optical signals having different wavelengths $\lambda_1$, $\lambda_2$, $\lambda_3$, $\lambda_4$ and $\lambda_B$. $\lambda_B$ is the wavelength used by the broadcast signal. The hub 110 provides the optical signals carried by the optical line of the ring 100 to the access nodes. Signals from each access node to the hub may be carried either by the identical wavelength used to carry signals from the hub to that access node or by a previously unassigned wavelength.

Signals which are to be broadcast are carried by the specified wavelength $\lambda_B$. Nodes on the network which are to receive the broadcast signals are equipped with wavelength-selective optical taps. These wavelength-selective optical taps drop a portion of the optical power at the node, and also carry the signals to the next node (or the next nodes) using the remaining optical power.

Signals in wavelength channels other than $\lambda_B$ are essentially undisturbed because wavelength channels are typically 25 to 200 GHz wide, though other channel widths are possible. These signals at other wavelengths than $\lambda_B$ can be transmitted straight through the node, or dropped at the node using a separate wavelength-add-drop (WAD).

The first wavelength-selective optical tap 130 drops the optical signal having a wavelength of $\lambda_1$, 10% of the energy of the optical signal having a wavelength of $\lambda_B$ and adds another optical signal having a wavelength of $\lambda_1$. Assuming that in our exemplary network 100 the optical loss between hub 110 and wavelength-selective optical tap 130 is negligible, 10% of the initial energy of the signal having the wavelength $\lambda_B$ is dropped at wavelength-selective optical tap 130, and 90% is transmitted towards the second wavelength-selective optical tap 140.

The second wavelength-selective optical tap 140 drops the optical signal having a wavelength of $\lambda_2$, 25% of the input energy of the optical signal having a wavelength of $\lambda_B$ and adds another optical signal having the wavelength of $\lambda_2$. Assuming that in our exemplary network 100 the optical loss between wavelength-selective optical tap 130 and wavelength-selective optical tap 140 is 3 dB, approximately 45% of the initial energy of the signal having a wavelength of $\lambda_B$ is input into wavelength-selective tap 140. Thus, approximately 11% of the initial energy of the signal having a wavelength of $\lambda_B$ is dropped, and 34% is transmitted towards the third wavelength-selective optical tap 150.

The third wavelength-selective optical tap 150 drops the optical signal having a wavelength of $\lambda_3$, 50% of the input energy of the optical signal having a wavelength of $\lambda_B$ and adds another optical signal having a wavelength of $\lambda_3$. Assuming that in our exemplary network 100 the optical loss between wavelength-selective optical tap 140 and wavelength-selective optical tap 150 is 1.5 dB, approximately 24% of the initial energy of the signal having a wavelength of $\lambda_B$ is input into wavelength-selective tap 150. Thus, approximately 12% of the initial energy of the signal having a wavelength of $\lambda_B$ is dropped, and 12% is transmitted towards the fourth wavelength-selective optical tap 160.

The fourth wavelength-selective optical tap 160 drops the optical signal having a wavelength of $\lambda_4$, the remaining energy of the optical signal having a wavelength of $\lambda_B$ and adds another optical signal having a wavelength of $\lambda_4$. Assuming that in our exemplary network 100 the optical loss between wavelength-selective optical tap 150 and wavelength-selective optical tap 160 is 1.5 dB, approximately 8% of the initial energy of the signal having a wavelength of $\lambda_B$ is dropped at this node.

In our exemplary system tap values have been chosen so that 10% +/−2% of the initial energy of the signal having a wavelength of $\lambda_B$ is dropped at each node. This is for illustrative purposes only. The presence of additional wavelength-selective optical taps, or different optical losses in the network, may cause the system designer to choose different tap values.

The use of wavelength-selective optical taps provides a low-cost fast way of efficiently tapping optical signals traveling throughout an optical network without disturbing other optical signals with wavelengths different from those corresponding to the wavelength-selective optical taps. Three exemplary embodiments of the systems according to this invention are shown in FIGS. 2–6.

Figure 2:
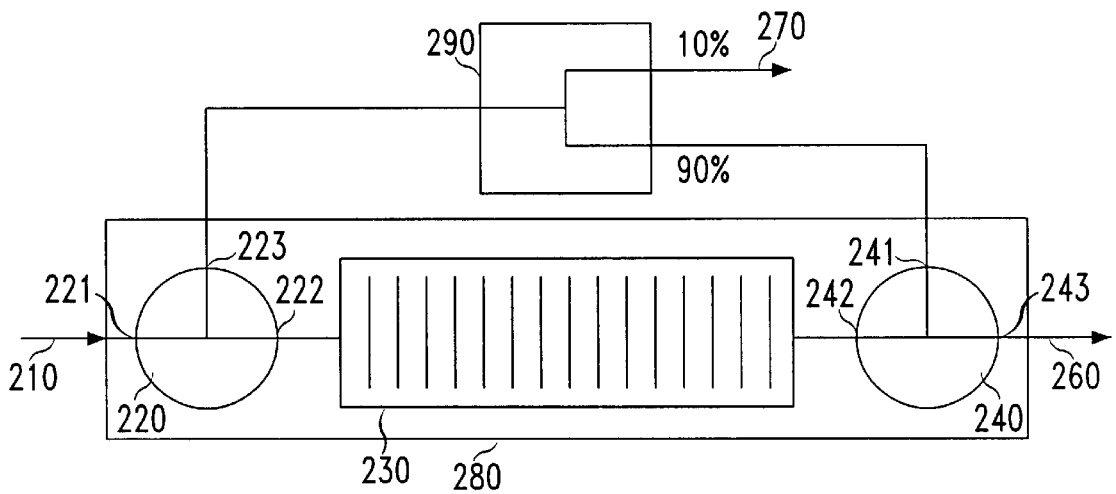
FIG. 2 is a schematic diagram of a wavelength-selective optical tap in accordance with a first exemplary embodiment of the invention.

FIG. 2 is a schematic diagram of a wavelength-selective optical tap according to a first exemplary embodiment of the invention. The wavelength-selective optical tap 200 shown in FIG. 2 includes a wavelength-add-drop multiplexer (WADM) 280 connected to the ring network 100, in combination with an optical coupler 290. The WADM drops a specified wavelength channel, while other wavelengths are transmitted through the device. WADMs utilizing various technologies are commercially available. For example, Giles et al. describe a WADM constructed of optical circulators and a fiber Bragg grating (C. R. Giles and V. Mizrahi, "Low-loss ADD/DROP multiplexers for WDM lighwave networks," *IOOC'95 Proc.*, 1995, Paper ThC2-1, pp. 66–67).

In FIG. 2, a WADM using Bragg grating technology is shown. The WADM 280 includes, on an input portion 210 of the ring network 100, a first optical circulator 220 that transmits the light 210 from the first port 221 to the second port 222. The signals enter a wavelength-selective reflector 230, e.g., a fully-reflecting Bragg reflector, that reflects all the energy of optical signals having a specific wavelength $\lambda_{WADM}$. The reflected light (at wavelength $\lambda_{WADM}$) enters circulator 220 at port 222, and exits from circulator 220 at port 223. The transmitted light (at wavelengths other than $\lambda_{WADM}$) passes through a second optical circulator 240. The dropped signal, having a wavelength of $\lambda_{WADM}$, is divided by the optical coupler 290 into two optical signals having the specific wavelength $\lambda_{WADM}$, each having a portion of the power of the dropped optical signal. The optical coupler 290 can be an optical coupler or any other device capable of dividing optical signals.

The first portion of the dropped signal having the specific wavelength $\lambda_{WADM}$ is outputted to an output local optical channel 270. In the embodiment shown in FIG. 2, the first portion represents 10% of the signal energy. The second portion of the dropped signal having the specific wavelength $\lambda_{WADM}$ is sent to the second optical circulator 240. It enters the optical circulator at port 241, which sends the light to port 242. Reflector 230 reflects the light (since it has wavelength $\lambda_{WADM}$) so that it reenters circulator 240 at port 242 where it is added to the signals that pass through the reflector 230. As shown in FIG. 2, the second portion represents 90% of the signal energy. Circulator 240 sends all the light from port 242 to port 243. This light is then outputted on output channel 260 of the ring 100.

The first exemplary embodiment of a wavelength-selective optical tap according to this invention shown in FIG. 2 can use conventional wavelength-selective add-drop multiplexers (WADMs) and an optical coupler with an appropriately chosen power-split. Thus, the first exemplary embodiment of a wavelength-selective optical tap according to this invention shown in FIG. 2 can use readily available components. If additional power is required, then an optical amplifier, such as a Semiconductor Optical Amplifier (SOA), can be placed before the optical coupler 290.

It is foreseeable that use of the first exemplary embodiment of a wavelength-selective optical tap according to this invention can lead to coherent crosstalk, because any light that leaks through the WADM will interfere with the light added. (See Charles X. Yu, Weyl-kuo Wang, and Stuart D. Brorson, "System degradation due to multipath coherent crosstalk in WDM network nodes," *Journal of Lightwave Technology*, Volume: 16, pp. 1380–1386, August 1998.) Therefore, second and third exemplary embodiments of the wavelength-selective optical tap are designed to minimize the potential for coherent crosstalk.

Figure 3:
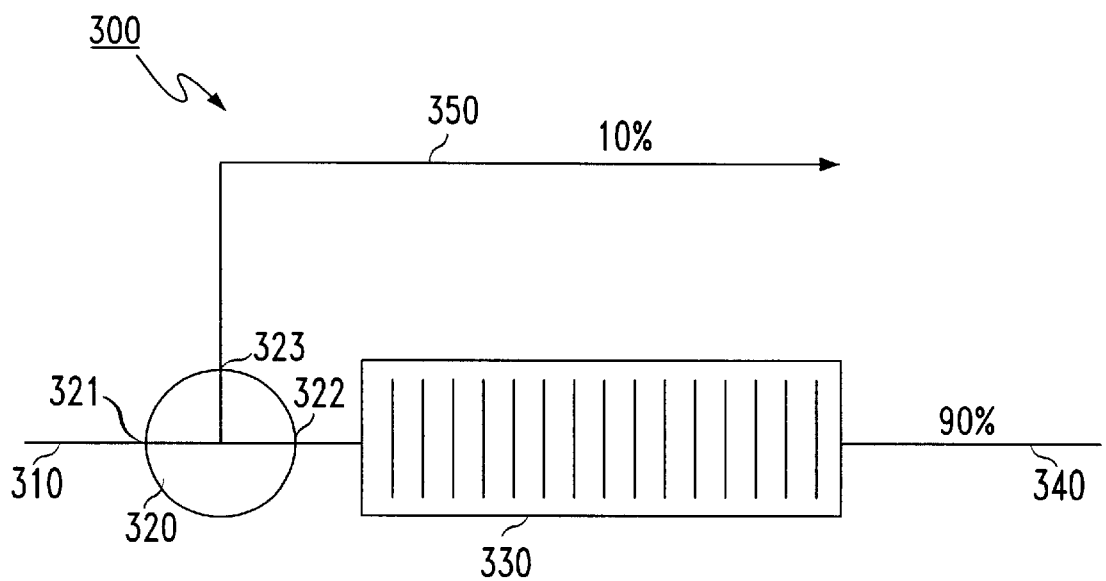
FIG. 3 is a schematic diagram of a wavelength-selective optical tap in accordance with a second exemplary embodiment of the invention.

FIG. 3 is a schematic diagram of the second exemplary embodiment of a wavelength-selective optical tap 300. In this second exemplary embodiment, the wavelength-selective optical tap only drops a fraction of the optical signal having a specific wavelength. As long as no spurious reflections are present, coherent crosstalk is eliminated. In the wavelength-selective optical tap 300 shown in FIG. 3, an optical circulator 320 is positioned on an input portion 310 of an access node in an optical network.

The optical circulator 320 transmits the light 310 from the first port 321 to the second port 322. The signals pass through a partially reflecting wavelength-selective reflector 330 and are then output on a primary optical channel 340. The primary optical channel is, for example, the ring network 100. Only a fraction of the optical power at wavelength $\lambda_B$ will be transmitted through the reflector 330. Substantially all the light in other wavelength channels will be transmitted through the reflector 330.

The light reflected by wavelength-selective reflector 330 enters circulator 320 at port 322, and exits from circulator 320 at port 323, and is output on a secondary optical channel 350.

As long as no spurious reflections are present, coherent crosstalk is eliminated. If the wavelength-selective optical tap's output to the primary optical channel (340) is followed by another WADM containing a circulator, then that circulator should provide sufficient isolation from back-reflections. Because most access nodes will also be served by wavelengths that are entirely dropped at that node, this additional WADM does not add any complexity to the network. Alternatively, the wavelength-selective tap may be followed by an optical isolator at 340.

The partially reflecting reflector 330 is a reflector that does not reflect the signals having wavelengths different from $\lambda_B$. Just as there are a variety of technologies that can be used to make wavelength add-drop multiplexers (WADMs), there are a variety of ways to make wavelength-selective optical taps. For example, both Bragg gratings and thin-film filters are used to make WADMs. Thus, both Bragg gratings and thin-film filters can also be used to make wavelength-selective optical taps.

The second exemplary embodiment of a wavelength-selective optical tap according to this invention shown in FIG. 3 is based on current wavelength-filter technology, but key parameters used in this technology are altered during the manufacturing process to enable a fraction of the power to be tapped, while the rest of the optical power is transmitted through the device so that the rest of the energy can be sent to the next node.

A partially reflecting reflector that does not reflect the signals with wavelengths different than $\lambda_B$ can have the structure of a Bragg grating but, as compared to a fully-reflecting Bragg-based reflector, the coupling coefficients and/or the length of the grating used in an WADM design are modified. By properly adjusting these parameters, the grating has the same width and central wavelength as an WADM; but instead of reflecting all of the light at the selected wavelength, it only reflects a fraction of the optical power at the specific wavelength. This is accomplished by keeping the length (L) and period (Λ) of the grating the same as the comparable WADM, and reducing the coupling coefficient (κ). For a detailed description of the properties of Bragg fiber gratings, see: T. Erdogan, "Fiber grating spectra," *Journal of Lightwave Technology*, Volume: 15 8, August 1997, Page(s): 1277–1294.

Figure 5:
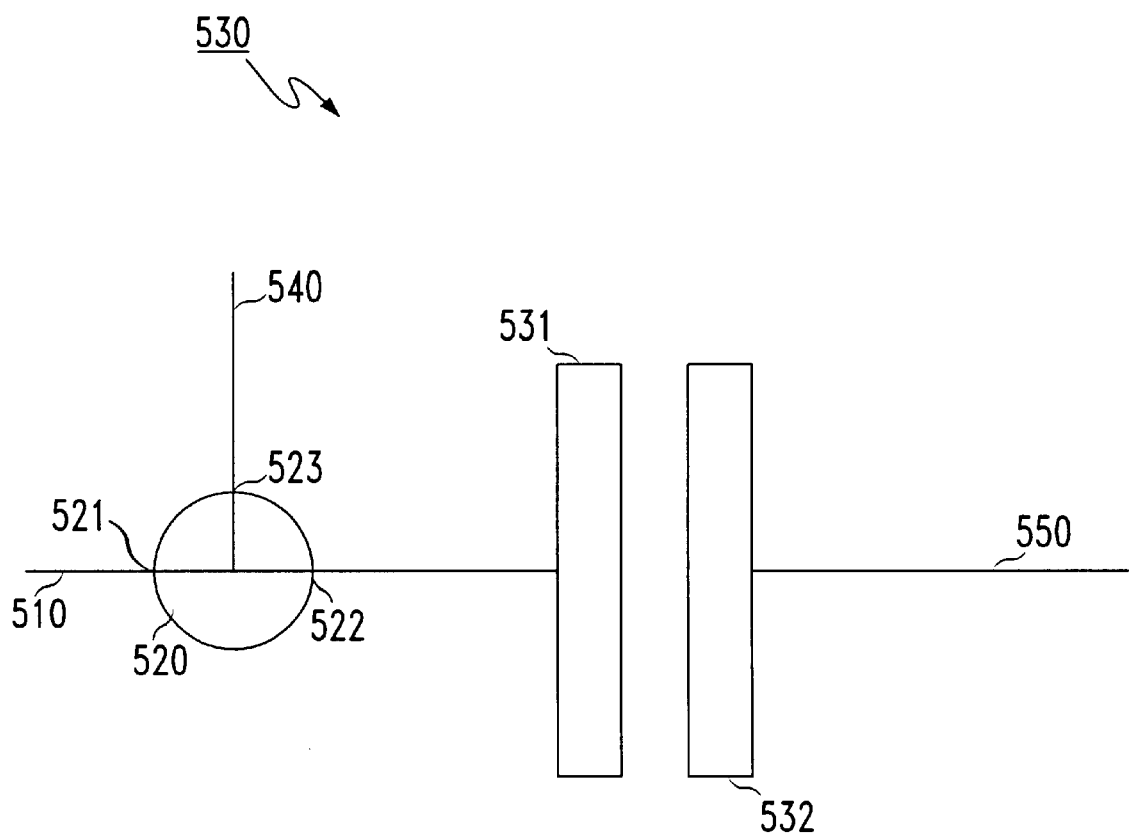
FIG. 5 is a schematic diagram of a wavelength-selective optical tap in accordance with a third exemplary embodiment of the invention.

FIG. 5 is a schematic diagram of the third exemplary embodiment of a wavelength-selective optical tap 500. As in the second embodiment, in this third exemplary embodiment, the wavelength-selective optical tap only drops a fraction of the optical signal having a specific wavelength. In the wavelength-selective optical tap 500 shown in FIG. 5, an optical circulator 520 is positioned on an input portion 510 of an access node in an optical network.

The optical circulator 520 transmits the light 510 from the first port 521 to the second port 522. The signals are reflected by a partially transmitting wavelength-selective device 530, then enter circulator 520 at port 522, and exit from circulator 520 at port 523. The signals are then output on a primary optical channel 540. The primary optical channel is, for example, the ring network 100. Only a fraction of the optical power at wavelength $\lambda_B$ will be reflected from device 530. The remaining portion of the optical power at wavelength $\lambda_B$ will be transmitted through the wavelength-selective device 530. Substantially all the light in other wavelength channels will be reflected from device 530.

The light transmitted by the wavelength-selective device 530 is output on a secondary optical channel 550. The partially transmitting wavelength-selective device 530 may have the structure of a Fabry-Perot reflector, including a first reflector 531 and a second reflector 532. However, as compared to a fully-reflecting Fabry-Perot based reflector, the reflectivity coefficient of the second reflector 532 is reduced. By properly adjusting the reflectivity coefficient of the second reflector 532, the partially reflecting reflector 530 only reflects a fraction of the optical power at the specific wavelength. This embodiment of the invention has the property that it may tap multiple specified wavelength channels. Fabry-Perot resonators have the property of reflecting wavelengths separated by the free-spectral range (FSR) of the resonator.

Therefore the embodiment shown in FIG. 5 will tap wavelength channels $\lambda_B \pm m\, \delta\lambda$, where m is an integer, and $\delta\lambda$ is the FSR of the cavity. Fabry-Perot based WADMs also have the property of dropping multiple channels.

The first, second, and third exemplary embodiments of a wavelength-selective optical tap shown in FIGS. 2, 3 and 5 are more efficient than the prior art method of dropping the entire wavelength, converting the optical signal to an electronic form, and then using the received signal to modulate another optical source and forward the signal on to the next node(s). Moreover, the second and third exemplary embodiments of a wavelength-selective optical tap are simpler and less prone to cross-talk than dropping the entire wavelength, tapping off some of the power using an optical coupler and adding the wavelength back into the network as in the first exemplary embodiment.

Figure 4:
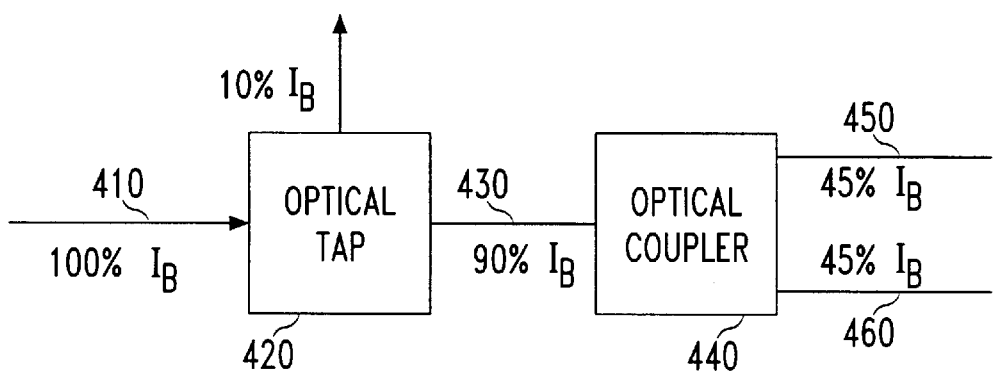
FIG. 4 is a schematic structure of a communications network using the wavelength-selective optical taps in accordance with the exemplary embodiments of the invention.

FIG. 4 illustrates a schematic structure of a communications network 400 using systems according to this invention. As shown on FIG. 4, a first wavelength-selective optical tap 420 receives an optical signal $I_B$ having a wavelength of $\lambda_B$ from optical channel 410. The optical tap 420 drops a first portion of 10% of the initial energy of signal $\lambda_B$. An optical coupler 440 is coupled to the first wavelength-selective optical tap 420 via optical channel 430. The optical coupler 440 further divides the energy of all the optical signals into two equal portions that are output on a primary optical channel 450 and a secondary optical channel 460, respectively. Each of those primary and secondary channels couple the second wavelength-selective optical tap 420 to other wavelength-selective optical taps that each drop a portion equal to 10% of the initial energy of the signal $I_B$ having a wavelength $\lambda_B$.

When designing a network such as that shown in FIG. 1, it is important that sufficient optical power will arrive at each access node to ensure that the information is transmitted accurately. Because a broadcast channel delivers information to multiple nodes, dropping only a fraction of the power at each, it may be necessary to launch more optical power in the broadcast wavelength channel than in other wavelength channels, which are being delivered to single nodes. When a wavelength channel is being dropped at a node, the WADM will cause the optical power at that wavelength to be dropped from the fiber. Unfortunately, it may also cause a small amount of light at other wavelengths to be dropped at that node, causing crosstalk.

The crosstalk from nearby wavelengths tends to be greatest, and is referred to as adjacent channel crosstalk. Adjacent channel crosstalk can also affect the broadcast channel, as the optical tap may cause a small amount of light at other wavelengths to be dropped. This crosstalk can be essentially eliminated by following the drop with a wavelength selective filter, which filters out the optical power at other wavelengths, but this would require an additional element in the node.

Because adjacent-channel crosstalk is proportional to the amount of power in the adjacent channel at the node, it is possible to assign wavelength channels so that adjacent channel crosstalk is minimal. Because the power launched in the broadcast channel may be greater than the power launched in the switched channels, in order to minimize the adjacent-channel crosstalk due to the broadcast channel, the broadcast wavelength should be chosen to be next to wavelengths serving nodes which are located after the broadcast channel has been tapped to serve other nodes. This will ensure that the power in the broadcast channel is not substantially greater than the power in the adjacent channels at the access nodes served by the adjacent wavelength channels.

In other words, it is preferable that each specific wavelength that is broadcast be closer to at least one wavelength serving a node which is located after at least one wavelength-selective optical tap than to wavelengths serving nodes which are located before wavelength optical taps.

For example, in FIG. 1, if the broadcast channel is launched with ten times more power than the channels at other wavelengths, then the broadcast channel wavelength should not be adjacent to the wavelength serving node 130, as the crosstalk from the broadcast channel may impair the wavelength channel dropped at node 130. If the broadcast channel is dropped at node 160, then the optical power in the broadcast channel and the optical power in the wavelength channel dropped at node 160 are approximately equal at node 160. Assuming that the broadcast signals and the other signals being delivered to the node have comparable signal-to-noise ratio (SNR) requirements, by assigning wavelength channels so that the optical power in the adjacent channel is substantially equal to the power in the broadcast channel at the adjacent channel's WADM, the crosstalk affecting both channels should be held to an acceptable level.

When the SNR requirements are comparable, then it is preferable to launch just enough optical power in the broadcast channel so that the received power in the broadcast channel is comparable to the received power in the switched channels. In this case, the power in the broadcast channel and the power in the channel serving the final access node served by the broadcast channel will be comparable at that node, and its wavelength channel should be the channel adjacent to the broadcast wavelength channel.

In other words, it is preferable that, at the last node of the network that receives at least one optical signal having a specific wavelength, the received power at at least one specific wavelength be substantially equal to the received power at other wavelengths that serve the node.

If the SNR requirements of the broadcast channel are different than the requirements for other wavelength channels, it is preferable to launch a different optical power in the broadcast channel so that the received SNR margin (the SNR minus the required SNR) of the broadcast channel is comparable to the received SNR margin of the switched channels. In this case, the SNR margin in the broadcast channel and the SNR margin in any other wavelength channel serving the final access node served by the broadcast channel will be comparable at that node. The optical power from the channel requiring the greater SNR will be greater, but since it cannot tolerate as much crosstalk as the other channel, this is appropriate. Once again, it is preferable to assign the wavelength channel adjacent to the broadcast channel to the final node served by the broadcast channel.

In other words, it is preferable that, at the last node of the network that receives at least one optical signal having a specific wavelength, the received signal/noise ratio margin at at least one specific wavelength is substantially equal to the received signal/noise ratio margin at a wavelength that serves the node.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

For example, it should be appreciated that at least one wavelength-selective optical tap according to this invention can be used to broadcast control information for controlling an optical network. The broadcast channel is used as a control channel for the network. The wavelength-selective optical tap according to this invention may simplify network management by enabling a control channel to broadcast status information to network elements. For example, the broadcast channel might update local databases containing routing information, thereby ensuring that all the access nodes had identical information at all times.

It should also be appreciated that at least one wavelength-selective optical tap according to this invention can be used to broadcast services to residential customers. In particular, digital television broadcasts can be performed according to the methods and systems of this invention.

Alternatively, the exemplary embodiments of the invention may be used by any organization having multiple locations served by a WDM network to broadcast signals to these locations. The network would narrowcast the signal, delivering it only to nodes serving the organization.

Further, it should be appreciated that this invention allows broadcasting of signals on any type of network, having a ring structure, a tree structure or a structure having both rings and trees.

What is claimed is:

1. An optical device adapted to receive at an input port a signal having wavelength 1, it being a wavelength-1 signal, and one or more signals having wavelengths other than 1, where a power ratio between said one or more signals and said wavelength-1 signal is at a given value, the optical device comprising:

a wavelength-selective optical tap that outputs a first portion of said wavelength-1 signal;

an output port that outputs a) a second portion of said wavelength-1 signal, and b) said one or more signals, where the power ratio at said output port between said one or more signals and said wavelength-1 signal is higher than said given value;

an optical unit that includes an input port, an output port, and a drop port, said optical unit characterized in that a signal applied to the input port is transferred to the output port, and a signal applied to the output port is transferred to the drop port, where said optical unit has its input port coupled to said input port of said device, and has its drop port coupled to said wavelength-selective optical tap; and a wavelength selective reflector having an egress coupled to said output port of said device, and an ingress coupled to the output port of said optical unit, said reflector characterized in that it fully passes to said egress signals applied to said ingress that have a wavelength other than wavelength 1, passes to said egress a preselected fraction, k, of a signal applied to said ingress when said signal is of wavelength 1, and reflects fraction 1−k of a signal applied to said ingress when said signal is of wavelength 1.

* * * * *